US011686932B2

(12) United States Patent
Sieckmann

(10) Patent No.: US 11,686,932 B2
(45) Date of Patent: Jun. 27, 2023

(54) HOLDER FOR A MICROSCOPE SLIDE, MICROSCOPE AND METHOD FOR CONTROLLING A MICROSCOPE

(71) Applicant: Leica Microsystems CMS GmbH, Wetzlar (DE)

(72) Inventor: Frank Sieckmann, Eppingen-Elsenz (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 383 days.

(21) Appl. No.: 16/472,229

(22) PCT Filed: Dec. 22, 2017

(86) PCT No.: PCT/EP2017/084304
§ 371 (c)(1),
(2) Date: Jun. 21, 2019

(87) PCT Pub. No.: WO2018/115398
PCT Pub. Date: Jun. 28, 2018

(65) Prior Publication Data
US 2020/0096756 A1 Mar. 26, 2020

(30) Foreign Application Priority Data
Dec. 23, 2016 (DE) .................... 10 2016 125 691.9

(51) Int. Cl.
*G02B 21/26* (2006.01)
*G02B 21/24* (2006.01)
*G02B 21/34* (2006.01)

(52) U.S. Cl.
CPC ........... *G02B 21/26* (2013.01); *G02B 21/245* (2013.01); *G02B 21/34* (2013.01)

(58) Field of Classification Search
CPC .... G02B 21/245; G02B 21/26; G02B 21/345; G02B 21/34
(Continued)

(56) References Cited

U.S. PATENT DOCUMENTS 4,453,807 A 6/1984 Faulkner et al.
4,641,930 A * 2/1987 Podvin .................. G02B 21/26
359/391
(Continued)

FOREIGN PATENT DOCUMENTS

CN 87206838 U 3/1988
CN 2831170 Y 10/2006
(Continued)

OTHER PUBLICATIONS

Office Action for Japanese Patent Application No. 2019-534174, dated Dec. 21, 2021, pp. 1-6, Japan Patent Office, Japan.

*Primary Examiner* — Thong Q Nguyen
(74) *Attorney, Agent, or Firm* — Leydig, Voit & Mayer, Ltd.

(57) ABSTRACT

A holder for a microscope slide includes a receiving area that has a first contact surface and a second contact surface opposite the first contact surface, a first counter-surface that at least partially spans the first contact surface, and a second counter-surface that at least partially spans the second contact surface. The receiving area is bounded on three sides by side elements and has an opening on one side for insertion of the microscope slide. At least one pressure element is arranged within the receiving area and configured to exert a restoring force directed towards an interior of the receiving area.

19 Claims, 8 Drawing Sheets

(58) Field of Classification Search
USPC .................................................. 359/368–398
See application file for complete search history.

(56) References Cited

U.S. PATENT DOCUMENTS

| | | | | |
|---|---|---|---|---|
| 4,836,667 A * | 6/1989 | Ozeki | .................... | G02B 21/24 |
| | | | | 359/389 |
| 5,350,069 A * | 9/1994 | Agwu | ............. | G01N 27/44704 |
| | | | | 206/456 |
| 6,020,995 A * | 2/2000 | Dreyer | .................. | G02B 21/34 |
| | | | | 206/454 |
| 6,361,745 B1 * | 3/2002 | Regan | ....................... | B01L 9/52 |
| | | | | 422/563 |
| 2002/0131167 A1 | 9/2002 | Nguyen et al. | | |
| 2002/0176161 A1 | 11/2002 | Yoneyama et al. | | |
| 2002/0187485 A1 * | 12/2002 | Jakobsen | ........... | G01N 33/6842 |
| | | | | 435/6.11 |
| 2003/0059281 A1 | 3/2003 | Kiene et al. | | |
| 2004/0240050 A1 * | 12/2004 | Ogihara | ................ | G02B 21/36 |
| | | | | 359/382 |
| 2012/0133757 A1 | 5/2012 | Thomas et al. | | |
| 2012/0168588 A1 | 7/2012 | Stratmann | | |
| 2014/0315283 A1 | 10/2014 | Calderwood et al. | | |
| 2015/0226662 A1 | 8/2015 | Hirono et al. | | |
| 2015/0346476 A1 | 12/2015 | Quarre et al. | | |
| 2017/0097369 A1 | 4/2017 | Durrant et al. | | |

FOREIGN PATENT DOCUMENTS

| | | |
|---|---|---|
| CN | 202471484 U | 10/2012 |
| CN | 103869460 A | 6/2014 |
| CN | 104630062 A | 5/2015 |
| CN | 205246965 U | 5/2016 |
| DE | 3222594 A1 | 1/1983 |
| DE | 19906422 A1 | 5/2000 |
| DE | 10143802 A1 | 3/2003 |
| DE | 102009020663 A1 | 11/2010 |
| EP | 1358939 A2 | 11/2003 |
| FR | 1166726 A | 11/1958 |
| JP | S48111148 U | 12/1973 |
| JP | S5421752 A | 2/1979 |
| JP | H10260361 A | 9/1998 |
| JP | 2004286484 A | 10/2004 |
| WO | WO 02/13967 A2 | 2/2002 |
| WO | WO 2004008106 A2 | 1/2004 |
| WO | WO 2006/098442 A1 | 9/2006 |
| WO | WO 2010071430 A1 | 6/2010 |
| WO | WO 2011029436 A2 | 3/2011 |
| WO | WO 2012040433 A1 | 3/2012 |
| WO | WO 2015197742 A | 12/2015 |

* cited by examiner

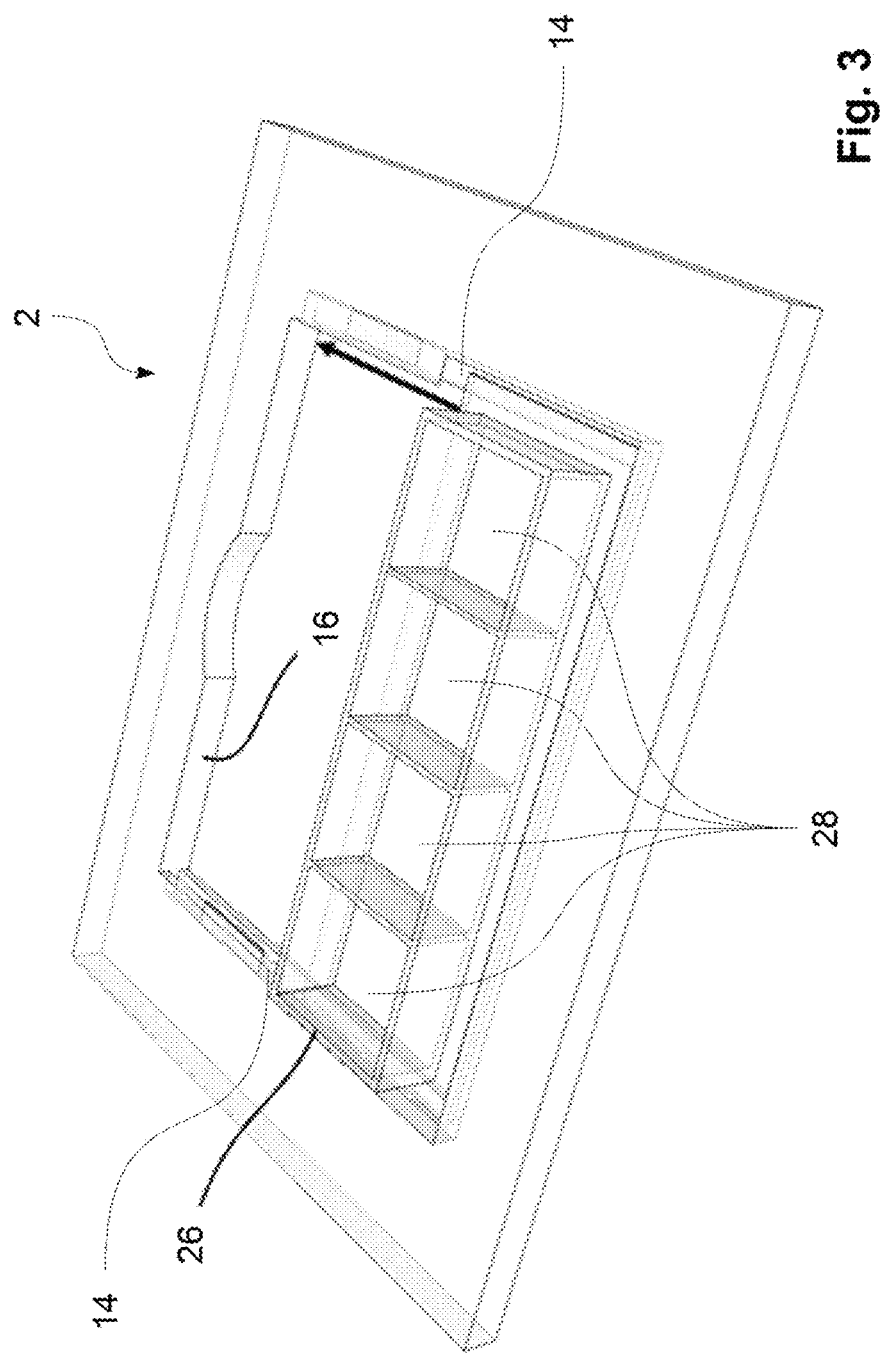

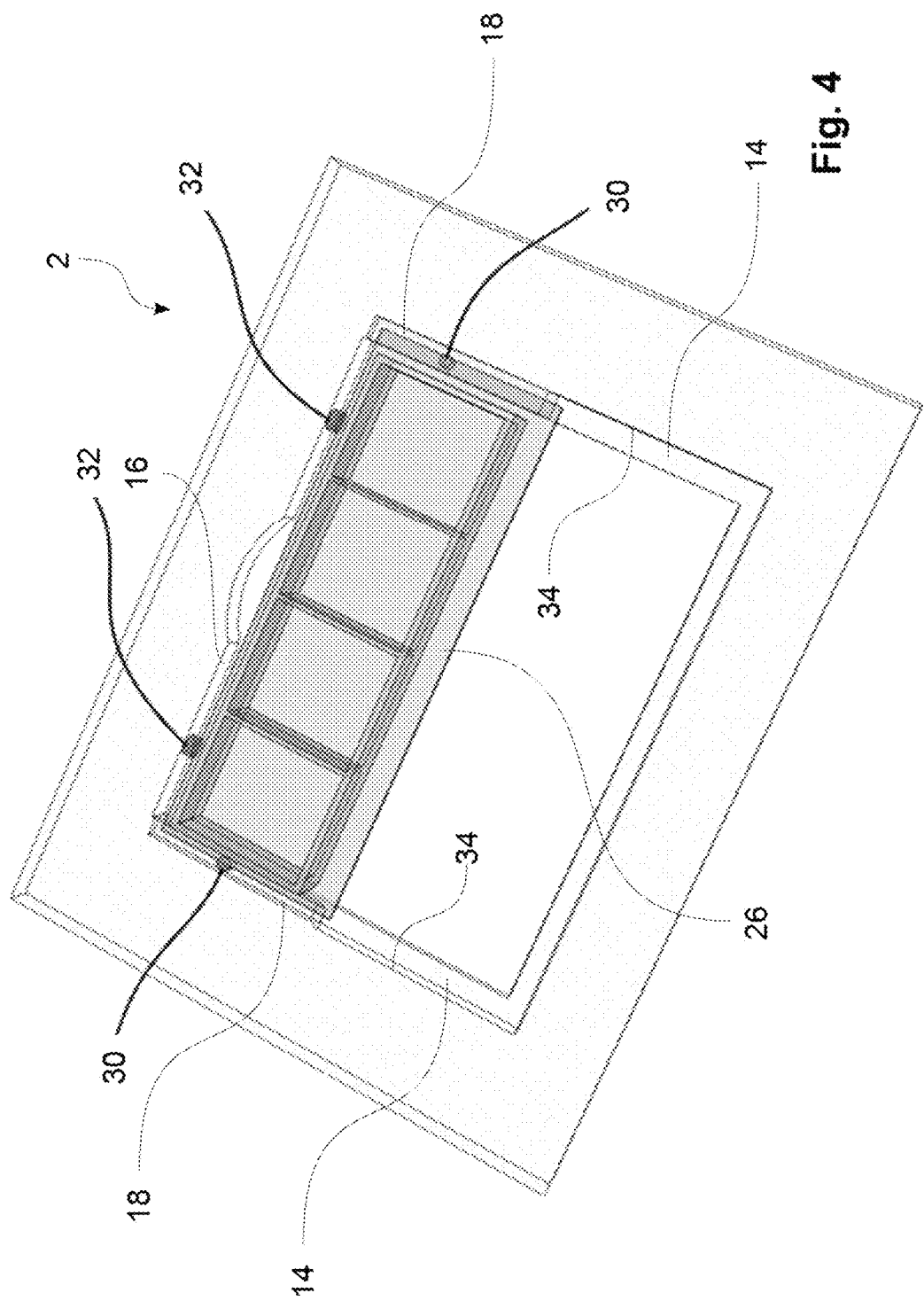

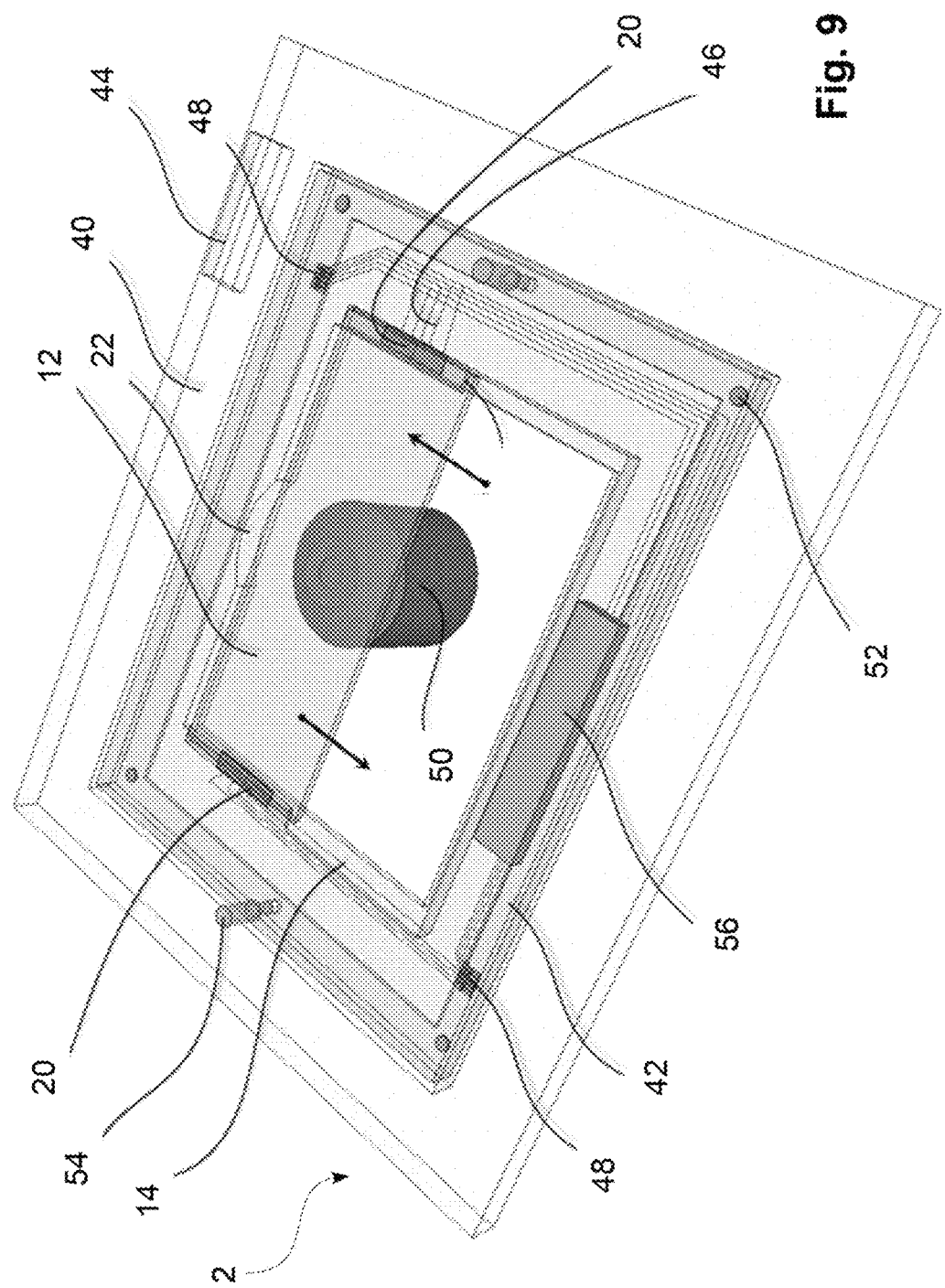

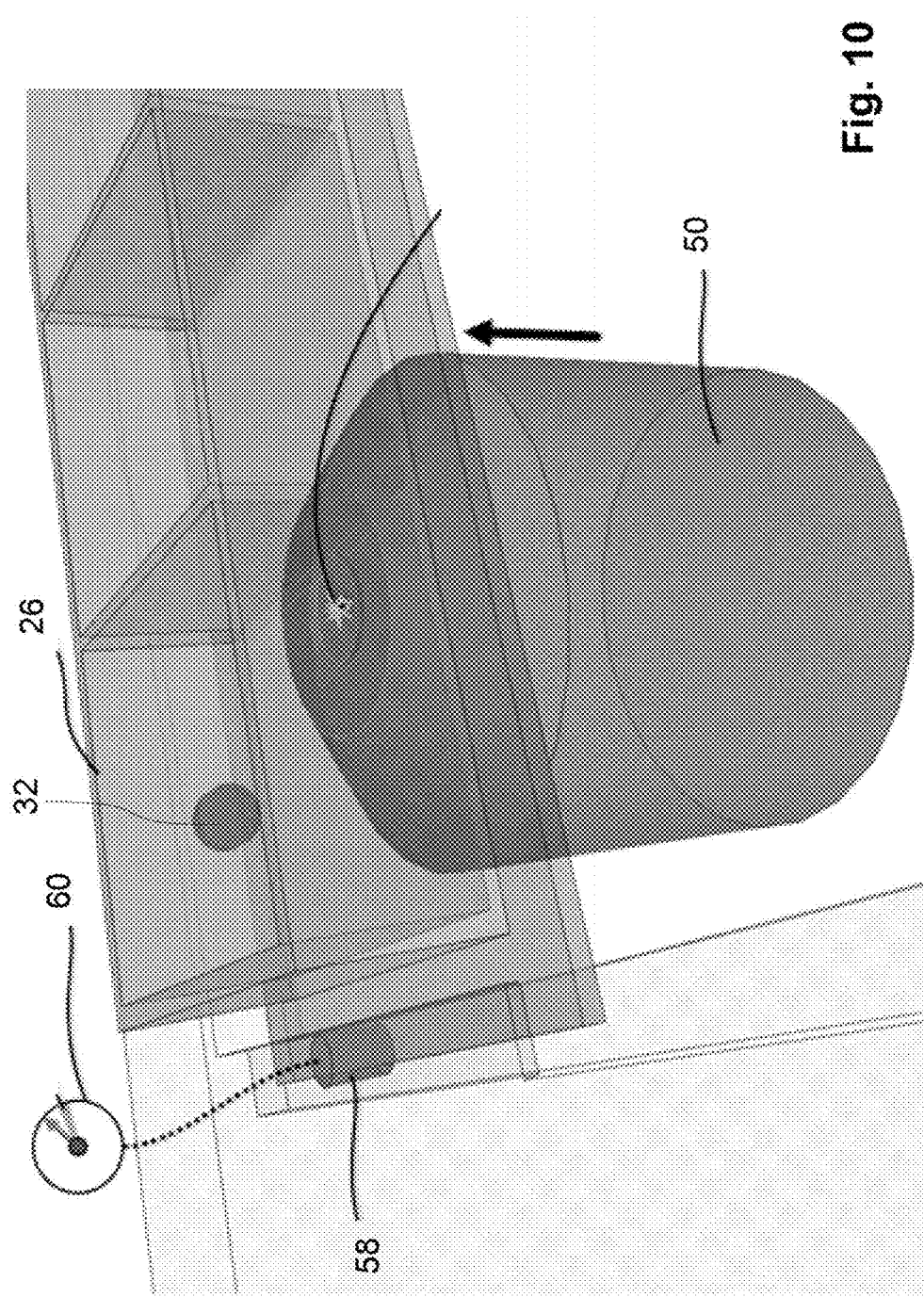

HOLDER FOR A MICROSCOPE SLIDE, MICROSCOPE AND METHOD FOR CONTROLLING A MICROSCOPE

CROSS-REFERENCE TO PRIOR APPLICATIONS

This application is a U.S. National Stage Application under 35 U.S.C. § 371 of International Application No. PCT/EP2017/084304 filed on Dec. 22, 2017, and claims benefit to German Patent Application No. DE 10 2016 125 691.9 filed on Dec. 23, 2016. The International Application was published in German on Jun. 28, 2018, as WO 2018/115398 A1 under PCT Article 21(2).

FIELD

The invention relates to a holder for a microscope slide, a microscope, and a method for controlling a microscope.

BACKGROUND

In nearly all currently known systems in which a microscope slide is used to insert a sample to be examined into a microscope, this is done in a similar manner. Typically, a microscope slide (i.e., usually a simple rectangular glass plate) is pressed into a milled-out recess with two metal clips. The metal clips are provided in such a manner that they exert a suitable pressure on the microscope slide, such that the microscope slide is pressed to the extent that it can only move slightly. In order to be able to insert a microscope slide, the metal clips are mounted so as to be rotatable such that they can be swiveled to change the microscope slide, such that they no longer exert any pressure on the microscope slide. The exposed microscope slide can then be levered out of the recess and removed. The insertion of a new microscope slide takes place in the reverse order.

SUMMARY

In an embodiment, the present invention provides a holder for a microscope slide including a receiving area that has a first contact surface and a second contact surface opposite the first contact surface, a first counter-surface that at least partially spans the first contact surface, and a second counter-surface that at least partially spans the second contact surface. The receiving area is bounded on three sides by side elements and has an opening on one side for insertion of the microscope slide. At least one pressure element is arranged within the receiving area and configured to exert a restoring force directed towards an interior of the receiving area.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 3 shows a view of the first exemplary embodiment in a third state, FIG. 4 shows a view of a second exemplary embodiment of a holder according to the invention, FIG. 9 shows a view of a third exemplary embodiment of the holder according to the invention, and FIG. 10 shows a detailed view of a holder according to the invention, as well as parts of a microscope.

DETAILED DESCRIPTION

Figure 1:
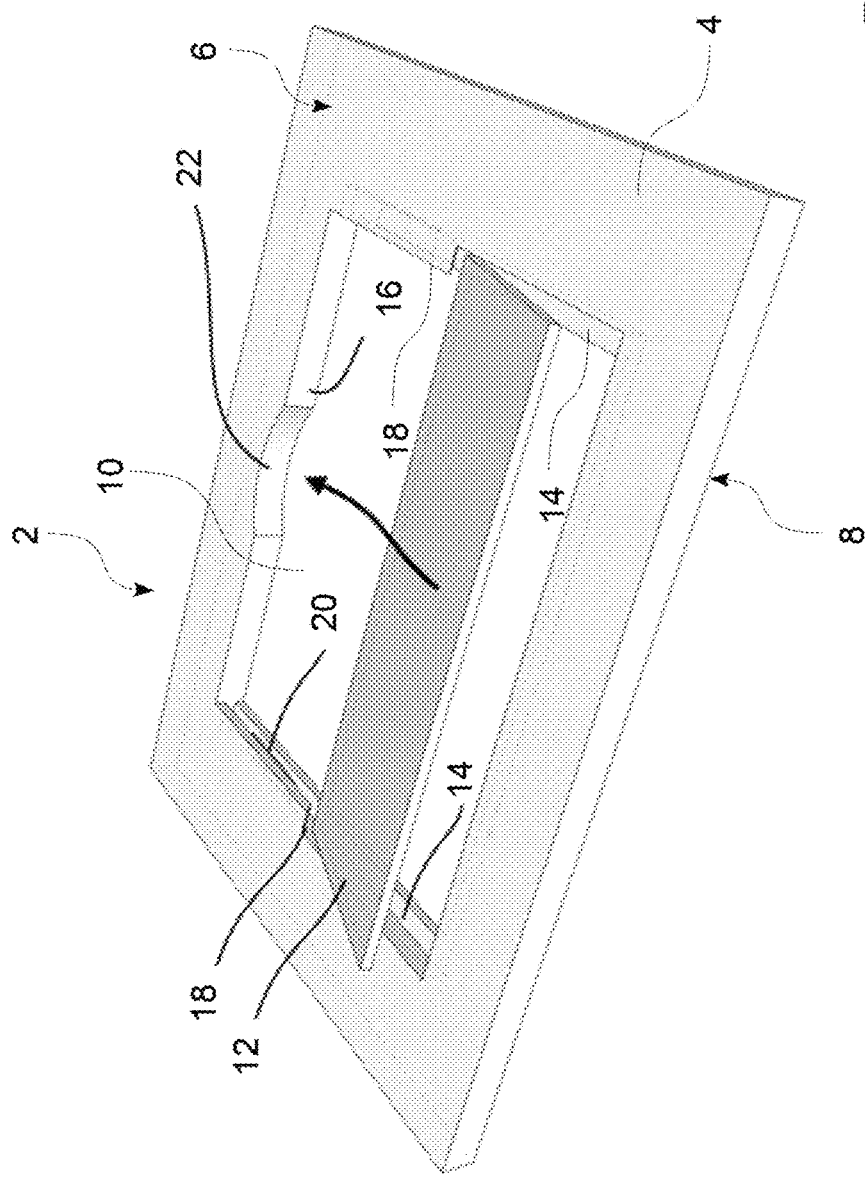
FIG. 1 shows a perspective view of a first exemplary embodiment of a holder according to the invention in a first state.

Due to the multitude of necessary work steps, the insertion of a microscope slide is very elaborate and can be automated only to a limited extent. The user must work with both hands and may injure himself on the metal clips, or damage his gloves. Both holding clips must be rotated. The holding clips can also damage the sample and are difficult to clean, such that contamination of the samples cannot be ruled out.

Moreover, it is desirable to improve the precision of the positioning of the microscope slide. This applies both to the reproducibility of the positioning given repeated insertion of the same microscope slide, and with respect to a constant maintenance of the same position during a longer experiment, for example when scanning a sample with a confocal microscope. In particular, the microscope slide can be displaced horizontally, since the friction force that is to be overcome between the holder clips and the glass of the microscope slide is very low during a horizontal movement. With time-lapse experiments, this reduces the ability to relocate of the position of an object.

Embodiments of the present invention address and provide solutions to these problems via a holder for a microscope slide with a receiving area that has a first contact surface and a second contact surface arranged opposite the first contact surface, a first counter-surface that at least partially spans the first contact surface, and a second counter-surface that at least partially spans the second contact surface, wherein the receiving area is bounded on three sides by side elements and has on one side an opening for the insertion of a microscope slide, and wherein at least one pressure element that can exert a restoring force directed towards the interior of the receiving area is arranged within the receiving area. Such a restoring force can, for example, point upwards, downwards, or in the direction of the opposite side element.

In other words, the holder has two slots, arranged opposite one another, into which the microscope slide can be inserted laterally. The inserted microscope slide is fixed in the holder by means of a pressure element. The pressure element can, for example, be a spring, an elastomer, or a similar elastic object. The pressure element exerts a clamping effect on the microscope slide. The force exerted by the pressure element is to be large enough to hold the microscope slide in its position and to secure it against unintentional movements, but at the same time allowing a simple manual or automatic removal of the microscope slide. Of course, the force may not be so great as to lead to damage or even a breakage of the microscope slide. The surface of the pressure element can be relatively soft in order to prevent damage to or the scratching of the microscope slide. A two-dimensional contact is preferably established between the pressure element and the microscope slide. The pressure element should generate sufficient frictional force to ensure that the microscope slide remains firmly in its position in the event of the unintentional application of force.

A microscope slide is understood to mean in particular a device that can receive an ensemble of metallic or biological or other three-dimensional samples, cells, or tissue sections for the purposes of further processing or observation, in particular microscopy. These can be in particular glass carriers, for example well plates or chamber slides, or other special slides.

The restoring force can act at least essentially or entirely parallel to the surface of the microscope slide. This ensures that the restoring force actually contributes only to the fixing of the microscope slide, and does not cause any undesirable tensions. However, it is also possible that the restoring force acts essentially perpendicular or exactly perpendicular to the surface of the microscope slide. In this instance, the microscope slide is clamped between the contact surfaces and the counter-surfaces, by contrast to which it is clamped between the side elements given a restoring force parallel to the surface of the microscope slide.

The contact surface may have a shape similar to the holders known from the prior art for microscope slides and, for example, may be a milled-out recess. The entire holder thereby has a large-area opening so that light can penetrate the opening, so that objects that are held can be examined with a microscope. The two contact surfaces opposite to one another thereby define the area available for the microscope slide. It is advantageous if the clearance between the two contact surfaces is somewhat smaller than the microscope slide to be inserted. The clearance between the opposing side elements is to be somewhat larger than the width of the microscope slide to be inserted. Transversal to this clearance, the contact surfaces can have an extent that is distinctly larger than one side of a microscope slide. For example, the contact surfaces can be at least 1.5 times, at least 2.0 times, or at least 2.5 times as long as one side of a microscope slide. A reasonable design results if here the respective short side of the usually rectangular microscope slide is used as the measure. The microscope slide can then first be placed on the contact surfaces and thereafter be pushed on the contact surfaces under the counter-surfaces. The microscope slide hereby enters the effective area of the pressure element(s) and is clamped tight.

The counter-surfaces delimit the space available to the microscope slide at the top, i.e. in a vertical direction, whereas the three side elements delimit the movement of the microscope slide in a horizontal direction, such that its position can be exactly defined. In other words, the space defined by the contact surfaces, the counter-surfaces, and the three side surfaces corresponds precisely to the dimensions of the microscope slide to be inserted, plus a small play that is required in order to be able to insert the microscope slide.

In absolute numbers, an advantageous embodiment of the microscope slide according to the invention provides that the vertical clearance between a contact surface and an associated counter-surface is between 0.5 mm and 5 mm, preferably between 1.0 and 3.0 mm, and particularly preferably between 1.0 and 2.0 mm. In this way, the holder can be adapted to commercially available microscope slides.

It is advantageously provided that the counter-surfaces run at least essentially parallel to the contact surfaces. It is also possible that the contact surfaces and the counter-surfaces run exactly parallel to one another within the scope of production accuracy. The feature that the counter-surfaces and the contact surfaces run at least essentially parallel to one another is thereby understood in particular to mean that the contact surfaces and the counter-surfaces enclose with one another an angle of less than 10°, preferably less than 5°, most preferably less than 2°.

A development of the invention provides that the extent of the contact surfaces in a first direction, which preferably corresponds to the insertion direction, is at least twice as large as an extent of the counter-surfaces. Such an embodiment makes it easier to insert and fix the microscope slide in the holder.

In accordance with the preferred embodiment of the invention, the pressure element(s) is/are mounted on the side elements. A restoring force can be thus be realized in a simple manner that acts exclusively on the microscope slide in the horizontal direction or at least essentially in the horizontal direction, and thus deploys an advantageous clamping effect.

According to an embodiment of the invention, pressure elements are arranged in both contact surfaces and/or in both counter-surfaces. In this way, the area available for an interaction of pressure element and microscope slide can be increased. It is also possible to arrange pressure elements both in the side surfaces and in the contact surfaces and/or in the counter-surfaces.

In an expedient embodiment, the counter-surfaces and the contact surfaces respectively form a right angle with the surfaces of the side elements pointing toward the receiving space. The shape of the receiving space is thus matched to the typically rectangular microscope slides.

According to an embodiment of the invention, a device for detecting a mechanical contact, or a pressure sensor, is arranged on at least one of the side elements. With the aid of the sensor or contact, it can then be determined whether a microscope slide is inserted into the holder, and whether the microscope slide has made contact with the appertaining side element and has thus reached its final position.

Such a sensor or contact can, for example, be designed as a microswitch; a light barrier; a capacitive, inductive, or piezoresistive pressure sensor; a piezoelectric or frequency-analog pressure sensor; a strain gauge; or by exploiting the Hall effect.

In particular, it is advantageous if the device for detecting a mechanical contact, or the pressure sensor, is arranged on the side element opposite the opening for insertion of a microscope slide. This is typically the rear wall of the holder. As long as there is no contact with the microscope slide here, the microscope slide must be pushed further into the slot.

It is possible that corresponding contacts or sensors are arranged both in one or more of the opposite side elements, typically the side walls, and in the rearward side element, thus typically the rear wall. A horizontal and vertical position test can then be performed.

In accordance with a preferred embodiment, a rear side element has the shape of a rear wall which has an engagement recess. The engagement recess may thereby be dimensioned such that a user can engage the engagement recess with one or more fingers to remove the microscope slide from the holder by sliding it toward the opening. If the holder has a closed frame, an engagement recess may also be arranged on the side of the frame opposite to the back side.

The holder can advantageously have a holding frame with which the holder can be attached to a microscope table. A modular design and a simple retrofitting of existing microscopes is thereby possible.

An embodiment of the invention provides that the clearance of the side elements from one another is smaller in the region of a rear side than in the region of the opening for the insertion of a microscope slide. In this way, the elasticity of the material from which the holder is produced can be utilized to apply the restoring force. This can occur in addition to the restoring force of the pressure element. In an embodiment that is particularly suitable for plastic microscope slides, the restoring force of the holder material can also be used exclusively. In this instance, the side elements themselves represent the pressure element(s).

The side elements are preferably executed as side walls. This feature also ensures that the receiving space corresponds as exactly as possible to the shape of the microscope slide. Furthermore, the manufacturing of the holder is simplified. A wall is thereby understood in particular to mean a vertically extending, flat boundary surface.

It is furthermore provided according to an embodiment to equip a microscope with a holder according to an embodiment of the invention for a microscope slide. Such a microscope is particularly simple to use.

In addition, a method for controlling a microscope is proposed, with the step of
a. insertion of a microscope slide along an insertion direction into a slotted receiving space of a holder for a microscope slide, wherein the microscope slide is moved along the insertion direction until a sensor arranged in a rear region of the receiving space detects a contact with the microscope slide.

In this way, whether a microscope slide is being inserted can be reliably determined. The user does not need to concentrate so much on the precise insertion of the microscope slide, and is unburdened especially in dark environments. In addition, an automation of the changing of slides is thus possible since the sensor signal can be used to control the automatic insertion of the microscope slide. Accordingly, the microscope slide can be inserted manually or automatically.

A development of the described method extends the method by the steps:
b. approach of a lens to the microscope slide until a pressure sensor mounted in the holder detects a change in pressure,
c. setting of a value of an actual clearance between the lens and microscope slide to zero, and
d. adjustment of the actual clearance such that it corresponds to the known free working clearance of the lens.

In this way, a coarse focusing can be performed on an object to be examined that is arranged on the microscope slide. As soon as the pressure sensor detects a change in pressure, and thus a contact of the lens with the microscope slide, the approach movement of the lens can be interrupted immediately. This prevents the user from damaging the microscope slide or even the lens during focusing.

A fine focusing can then take place. This can take place manually or automatically. Additional control parameters, which can be obtained via a camera, for example, can hereby be used.

Exemplary embodiments of the invention are explained in more detail using the drawings and the following description.

At this point, it is noted that the microscope slides shown in Figures do not belong to the holder according to embodiments of the invention. However, they are shown to illustrate the function. Holders according to embodiments of the invention can be manufactured with minor adaptations to a variety of differently designed microscope slides.

FIG. 1 shows a schematic view of a first exemplary embodiment of a holder 2 according to the invention. The holder 2 has a circumferential frame 4 having a top side 6 and a bottom side 8. The frame 4 is structured to be rectangular and basically disc-shaped. In other words, its extent is distinctly smaller in the vertical direction than in the two horizontal directions. A recess 10 is arranged in the frame 4, which recess 10 has approximately the width of a microscope slide 12 also shown for viewing. The term "width" hereby refers to the extent of the microscope slide 12 along its longest side. Likewise, the "width of the recess 10" is the extent of the recess 10 along the side parallel to the longest side of the microscope slide 12 in the Figure. For this purpose, the "length of the recess 10" is to extend at right angles; "height" is respectively understood to mean the extent along the shortest side.

Opposite one another and extending over the entire length of the recess, two contact surfaces 14 are arranged at the edge of the recess. The contact surfaces 14 have a width of a few millimeters, such that a microscope slide can be securely placed there. The contact surfaces 14 can be executed in one piece with the frame 4. Both the frame 4 and the contact surfaces 14 are comprised of metal. It is possible to coat the contact surfaces 14, for example with a sliding layer or an anti-slip layer, in order to obtain the desired behavior when inserting the microscope slide 12.

In the rear region of the recess 10, thus in the area adjoining the rear side, counter surfaces 18 are arranged at a distance from the contact surfaces 14 and parallel thereto. Their length corresponds approximately to the length of the microscope slide 12, or to approximately half the length of the recess 10. The vertical clearance between the contact surfaces 14 and the counter-surfaces 18 is dimensioned in such a manner that the microscope slide 12 can be inserted but has only a small play in the vertical direction. In other words, the clearance is slightly greater than the height of the microscope slide 12 to be inserted. The contact surfaces 14 and counter-surface 18, which are respectively arranged one above the other, define a cavity that can be occupied by the microscope slide 12 to be inserted and in which this is held. The counter-surfaces 18 can also be executed in one piece with the frame 4. For example, the intermediate space between the contact surfaces 14 and the counter-surfaces 18 can be milled out.

Pressure elements 20 are arranged at the underside of the counter-surfaces 18. These pressure elements 20 are made of an elastic material and can be compressed in the vertical direction. They then exert a restoring force directed against the direction of compression. This presses an inserted microscope slide 12 against the contact surface, such that an unintentional movement of the microscope slide 12 in the horizontal direction is avoided. In the example shown, the pressure elements 20 are executed flat and extend over a majority of the width of the counter-surfaces 18, and over slightly more than half the length of the counter-surfaces 18.

In the rear region of the frame 4, the rear side 16 can be seen. It is executed in the form of a simple vertical rear wall and has an engagement recess 22, which represents a rounded recess and has approximately the diameter of a human finger. The engagement recess 22 allows the simple removal of a microscope slide 12 in that the microscope slide 12 is pushed forward. The microscope slide 12 thus reaches a region in which the contact surfaces 14 are not covered by counter-surfaces 18. The microscope slide 12 can thus be removed upward.

FIG. 1 shows a snapshot taken while inserting the microscope slide 12. The rear edge of the microscope slide 12 has already been placed on the contact surfaces 14 and is then swiveled such that it is parallel to the surface of the holder 2 and fully rests in the region in which microscope slide 12 and contact surface 14 overlap. The microscope slide 12 can then be displaced in the direction of the drawn arrow, such that it is clamped between the contact surfaces 14 and the counter-surfaces 18. The microscope slide 12 can be inserted into the slots between the contact surfaces 14 and the counter-surfaces 18 until it strikes the rear wall 16.

Figure 2:
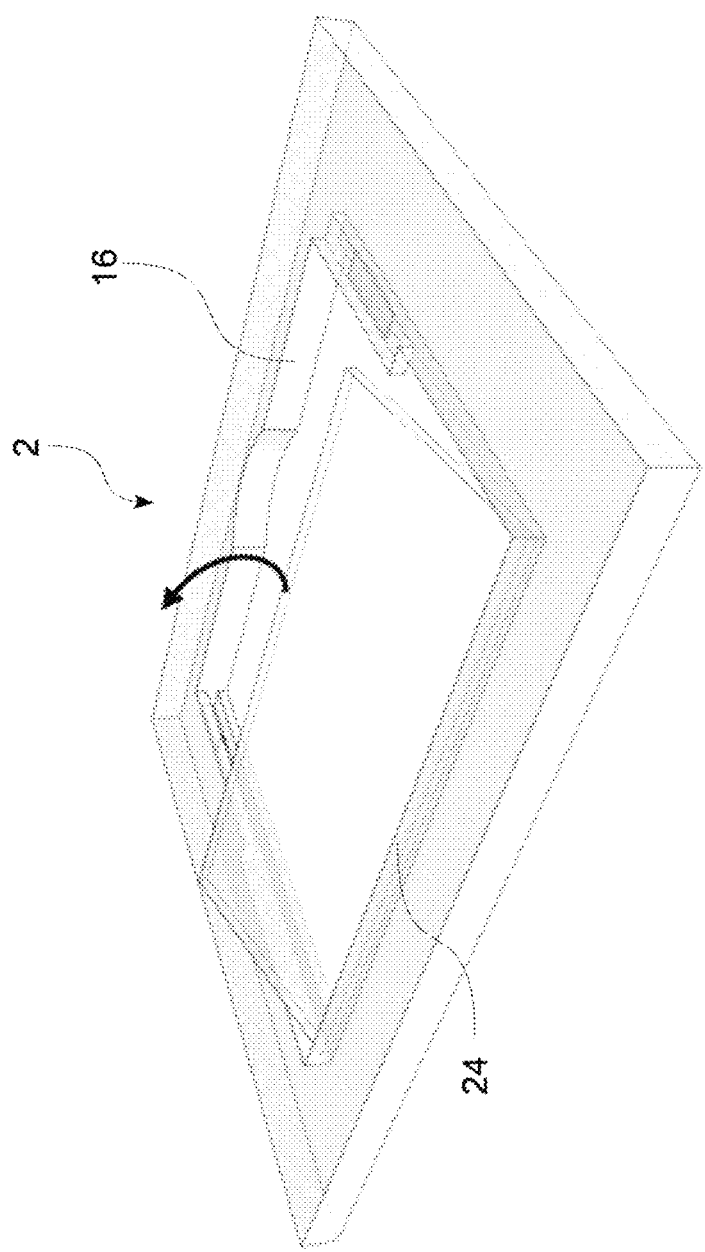
FIG. 2 shows a view of the first exemplary embodiment in a second state.

FIG. 2 shows the same exemplary embodiment as FIG. 1, but in a situation upon removal of the microscope slide 12. Here the microscope slide 12 has here already been displaced from the measuring position, into which it was pushed in as far as the rear stop in the form of the rear wall 16, into the removal position. The microscope slide 12 was hereby pushed to the front stop in the form of the front wall 24, and is now swiveled along the drawn arrow so that it can be comfortably removed. In the measuring position, the microscope slide is located entirely in the receiving region.

FIG. 3 shows the same exemplary embodiment as FIGS. 1 and 2. To illustrate the versatility of the holder, a microscope slide 26 that is different than the microscope slide shown above is shown, having a structure that provides four sample chambers 28, extending in the vertical direction. The shown microscope slide 26 already rests on the contact surfaces 14 and can now be pushed into the measuring position along the drawn arrow.

FIG. 4 shows a second exemplary embodiment of a holder 2 according to the invention. The shown exemplary embodiment essentially corresponds to the example shown in FIGS. 1 to 3. The same reference signs designate the same elements. In addition, however, two lateral pressure sensors 30 and two rearward pressure sensors 32 are present. The lateral pressure sensors 30 are thereby located in the side walls 34 in the rear region between the contact surfaces 14 and the counter-surfaces 18. The rearward pressure sensors 32 are arranged in the rear wall 16.

The two rearward pressure sensors 32 determine whether the sample has been inserted correctly up to the rear stop point, and whether there is a contact between microscope slide 26 and rear wall 16. The two lateral pressure sensors 30 check whether pressure or a pressure change is being applied to the microscope slide 26 from below. This pressure could, for example, be exerted by a lens that accidentally touches the microscope slide 26. With the pressure sensors 30, 32, several problems can now be solved which, up to now, could lead to breakage of microscope slides, to defective lenses, and to incorrect controls. Detailed possibilities for using the sensors are described further below.

Figure 5:
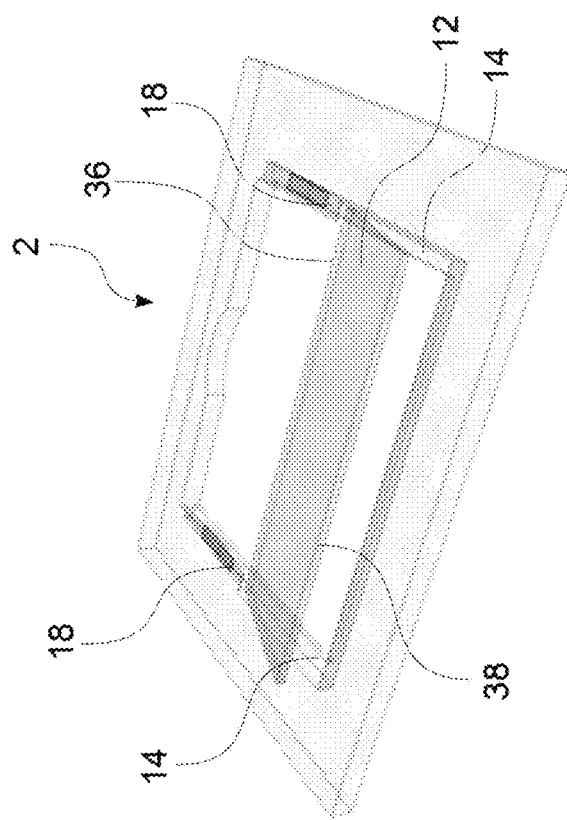
FIG. 5 shows a first step upon inserting a microscope slide.

FIGS. 5 to 8 show the process of inserting a microscope slide 12 into the holder 2 using the first exemplary embodiment, which is also shown in FIGS. 1 to 3. FIG. 5 thereby corresponds to FIG. 1: The microscope slide 12 has been placed with its rear edge 36 on the contact surfaces 14. The front edges of the counter-surfaces 18 can hereby serve as a stop for the microscope slide 12. The microscope slide 12 is now swiveled such that the front edge 38 moves downwards, and the microscope slide 12 ultimately rests flat on the contact surfaces 14.

Figure 6:
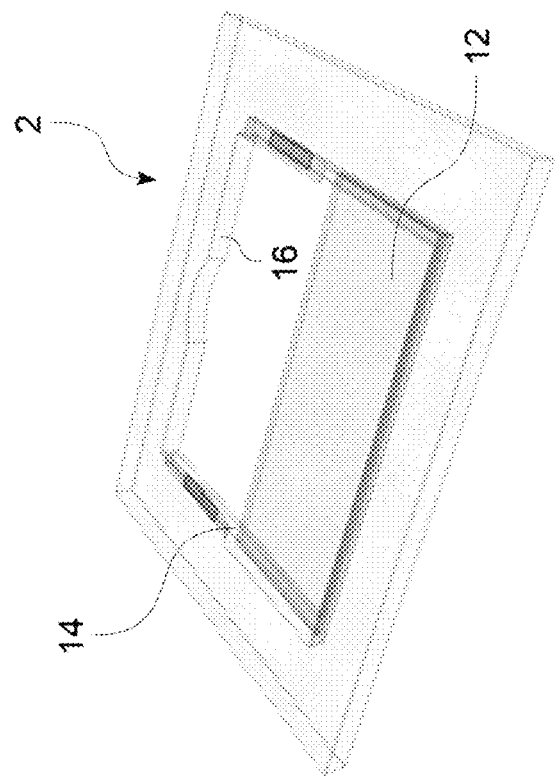
FIG. 6 shows a second step upon inserting a microscope slide.
Figure 7:
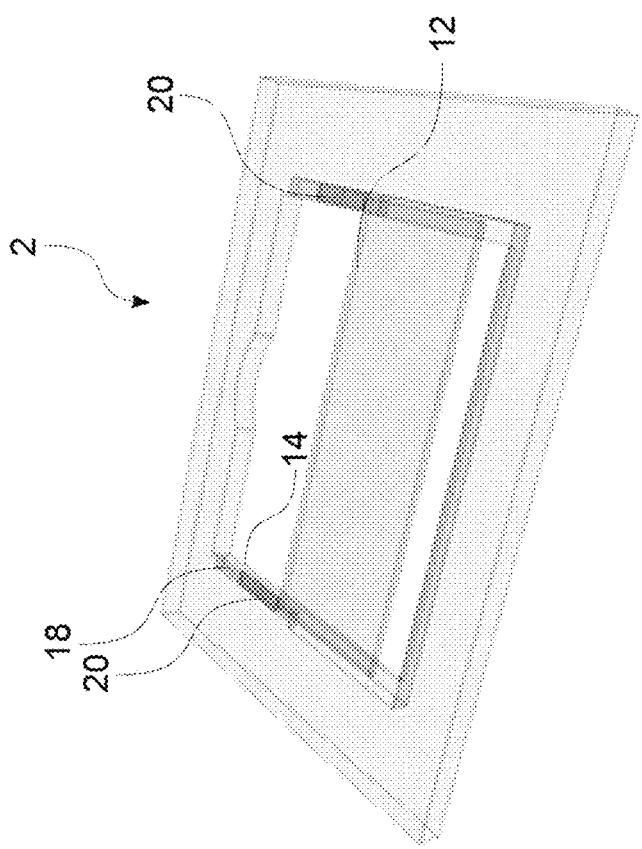
FIG. 7 shows a third step upon inserting a microscope slide.

The state shown in FIG. 6 is now achieved. The microscope slide 12 can now be moved in the direction of the rear wall 16, parallel to the contact surfaces 14. A corresponding view is shown in FIG. 7. The microscope slide 12 has already partially penetrated into the slot formed by the contact surfaces 14 and the counter-surfaces 18. A portion of its surface is covered by the counter-surfaces 18. In the shown state, the microscope slide 12 just comes into contact with the pressure elements 20. The user notices this by a slightly increased resistance in the sliding direction.

Figure 8:
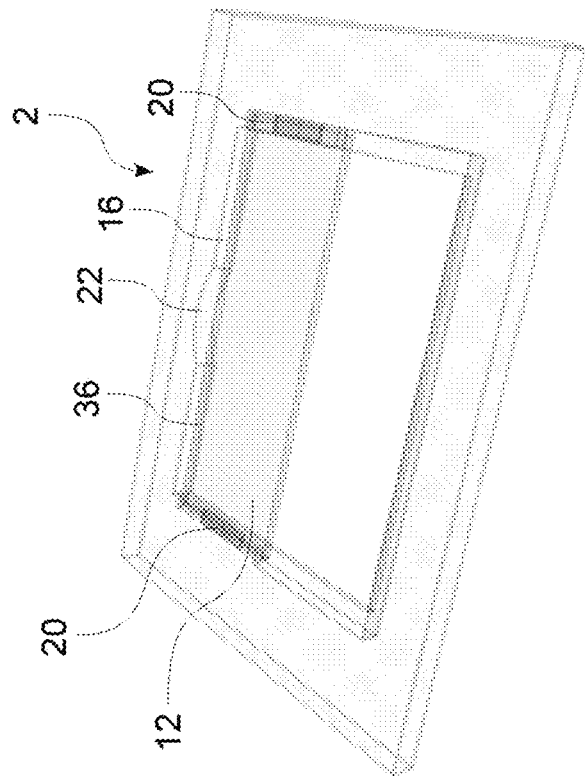
FIG. 8 shows a fourth step upon inserting a microscope slide.

The microscope slide 12 is now pushed further until it reaches the state shown in FIG. 8, and the insertion of the microscope slide 12 into the holder 2 is completed. The microscope slide 12 has now reached the measuring position. With its rear edge 36, the microscope slide 12 has now made contact with the rear wall 16 of the holder 2. The microscope slide 12 has assumed a stable position from which it can only be moved out with an application of force that can be adjusted via the embodiment of the pressure elements 20. Thus, an undesired movement during the measuring process is avoided with certainty.

The removal of the microscope slide 12 takes place in the reverse order. So that the user can also exert a horizontal force on the microscope slide 12 in the measuring position in a simple manner in order to displace it into the removal position, the engagement recess 22 is arranged on the rear wall 16, in which recess 22 the user can engage with a fingertip or a fingernail.

FIG. 9 shows a third exemplary embodiment of a holder 2 according to the invention. Features that do not differ from the exemplary embodiments described above are not mentioned separately at this point, but may be identified as necessary in the Figure by identical reference signs.

In contrast to the exemplary embodiments already described, the holder 2 shown here has an outer holding frame 40. This can be firmly connected to a microscope, or it can be identical to the tabletop of the microscope stage. The outer holding frame 40 accommodates the inner frame 42, which is designed very similar to the exemplary embodiments described further above. Various inner frames 42 adapted to the respective sample types can be inserted into the outer holding frame 40. The microscope can thus be configured for different microscope slides without time-consuming modifications. The holding frame 40 can have a connection 44 to which, for example, a power connection and/or a connection for a data line can be realized via a plug connection.

The pressure elements 20 can also be connected to a line system 46. At the contacts 48, data and/or power can be transferred between the inner frame 42 and the outer holding frame 40. In this way, a plurality of sensors can be connected and operated.

For example, the sensors can be pressure contacts or pressure sensors that are accommodated in the pressure elements 20 in such a manner that they can measure whether a microscope slide 12 is inserted in the holder 2. In addition, the sensors can not only respond to simple contact, but also quantitatively evaluate the pressure in order to thereby measure the pressure applied by a contact between the lens 50 and the microscope slide 12. By measuring the pressure, the system can then detect whether the lens 50 is exerting pressure on the microscope slide 12, and take appropriate countermeasures.

If the pressure measurement yields that the lens 50 is touching the microscope slide 12 and is pushing it upwards (inverted microscope) or downwards (upright microscope), such that there is a danger that such pressure will break the microscope slide 12, the system can react appropriately, for example by preventing the user from moving the lens 50 further in the direction of the microscope slide 12, so that the microscope slide 12 cannot be destroyed.

At the same time, the detection of an increase in pressure can also be utilized to find a capture range for the focus, and to automatically adjust the position of the lens 50. For this purpose it is utilized that the free working clearance for each lens 50 is known. If, for example, the working clearance of the lens 50 is 250 pm, then the optimum position (that is, the clearance of the lens 50 from the microscope slide 12) can be set automatically as soon as a contact between the lens 50 and the microscope slide 12 has been detected with certainty. At the moment of contact, the pressure on the pressure sensors now increases, which sensors then output a corresponding signal. With this signal as a trigger, the system can now automatically adjust the clearance of the lens 50 from the microscope slide 12 to the working clearance. For example, this can happen in that a value for the actual clearance is set to zero as soon as a sensor detects a contact of the lens 50 with the microscope slide 12. On this basis, the actual clearance can then be set to the known free working clearance of the lens 50. The system is then automatically approximately in focus. The optimum focus can then be easily found via a subsequent downstream autofocusing process.

The inner frame 42 can be fixed by small magnets 52 arranged in the corners of the outer holding frame 40, which can be designed as neodymium magnets, for example. In addition, the inner frame 42 can be screwed tight in the current position by means of small handles 54 that can be manually screwed in. The handles 54 also serve to allow the inner frame 42 to be easily removed. For example, the handle 54 can be designed like a screw equipped with a hand grip.

A connection of the electrical cables of the inner frame 42 with the outer holding frame 40 is thereby established automatically via contacts 48, such that the cable routing is forwarded to the connection 44, thus enabling the power supply and data cables to be connected to the outside world.

In addition, the inner frame 42 can have a small clamping space 56 which is prepared for connecting and/or receiving electronic components, for example a camera or a temperature sensor.

FIG. 10 shows an enlarged section of the exemplary embodiment shown in FIG. 9. It can be seen that the microscope slide 26 has been brought into the measuring position. The lens 50 is approached from below. This procedure is typical; the user looks through the eyepiece of the microscope and approaches the lens 50 to the microscope slide 26 until he sees a sharp image. In the shown situation, the approach motion has already led to an undesirable contact between lens 50 and microscope slide 26, which is symbolized by the small star. There is a risk of damage to the microscope slide 26 and/or the lens 50. The pressure sensor 58, shown enlarged in FIG. 10, can detect a collision of the lens 50 with the underside of the microscope slide 26. A suitable controller can then stop the further movement of the lens 50 and optionally distance the lens 50 somewhat from the microscope slide 26 again, so that a safe clearance is maintained. Furthermore, the rearward pressure sensor 32 is apparent.

The pressure sensor 58 measures the pressure applied to it. It is mounted on the underside of the counter-surface 18, such that it can detect an upwardly directed movement of the microscope slide 26 or an increase in the upwardly directed pressure. Of course, it is also possible in principle to use a pressure reduction of a pressure sensor arranged on the top side of the contact surface 18 as an input signal.

If a pressure change now occurs and exceeds a predetermined threshold, the further upward movement of the lens 50 can be automatically interrupted and/or a warning message or signal tone can be output. In this way, damage to the lens 50 and/or the microscope slide 12 can be avoided. The predetermined threshold is graphically illustrated in the Figure by a schematically shown pointer instrument 60.

For an upright microscope, in which the lens is moved from above in the direction of the sample, an analogous design can be created. In such an instance, the pressure sensors are then arranged on the top side of the contact surface in order to be able to detect an increase in pressure in the event of a collision.

In order to be able to use the holder for both upright and inverted microscopes at the same time, the holder can be equipped with multiple pressure sensors that combine the two principles described above. Sensors are then arranged both on the underside of the counter-surfaces and on the top side of the contact surfaces.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

2 Holder
4 Frame
6 Top side
8 Underside
10 Recess
12 Microscope slide
14 Contact surface
16 Rear wall
18 Counter-surface
20 Pressure element
22 Engagement recess
24 Front wall
26 Microscope slide
28 Sample chamber
30 Side pressure sensors
32 Rearward pressure sensors
34 Side wall 36 Rear edge
38 Front edge
40 Outer holding frame
42 Inner frame
44 Connection
46 Cable system
48 Contact
50 Lens
52 Magnet
54 Handle
56 Clamping space
58 Pressure sensor
60 Pointer instrument

The invention claimed is:

1. A holder for a microscope slide that has a width and a length, the length being less than the width, the holder comprising:
 a receiving area that has a first contact surface and a second contact surface opposite the first contact surface, a first counter-surface that partially spans the first contact surface so as to form a first slot extending in a direction of insertion along the length of the microscope slide, and a second counter-surface that partially spans the second contact surface so as to form a second slot extending in the direction of insertion along the length of the microscope slide, wherein the first contact surface and the second contact surface extend in the direction of insertion along the length of the microscope slide at least twice as far as an extent of the first counter-surface and the second counter-surface, such that the microscope slide travels along the first contact surface and the second contact surface before receipt in the first slot and the second slot, wherein the receiving area is bounded on three sides by side elements and has an opening on one side for insertion of the microscope slide; and
 at least one pressure element arranged within the receiving area and configured to exert a restoring force directed towards an interior of the receiving area.

2. The holder according to claim 1, wherein a vertical clearance between one of the contact surfaces and an associated one of the counter-surfaces is between 0.5 mm and 5 mm.

3. The holder according to claim 2, wherein the vertical clearance is between 1.0 mm and 3.0 mm.

4. The holder according to claim 3, wherein the vertical clearance is between 1.0 mm and 2.0 mm.

5. The holder according to claim 1, wherein the counter-surfaces run at least essentially parallel to the contact surfaces.

6. The holder according to claim 1, wherein the at least one pressure element is mounted on at least one of the side elements.

7. The holder according to claim 1, wherein the at least one pressure element include pressure elements arranged in both contact surfaces and/or in both counter-surfaces.

8. The holder according to claim 1, wherein the first and the second counter-surfaces and the first and the second contact surfaces respectively form a right angle with the surfaces of the side elements pointing toward the receiving area.

9. The holder according to claim 1, further comprising a device for detecting a mechanical contact, or a pressure sensor, is arranged on at least one of the side elements.

10. The holder according to claim 9, wherein the device for detecting the mechanical contact, or the pressure sensor, is arranged on the side element opposite the opening for insertion of the microscope slide.

11. The holder according to claim 1, wherein a rear one of the side elements has the shape of a rear wall, which has an engagement recess.

12. The holder according to claim 1, further comprising a holding frame which receives the holder.

13. The holder according to claim 1, wherein a clearance of the side elements is smaller in a region of a rear side than in a region of the opening for the insertion of the microscope slide.

14. The holder according to claim 1, wherein the side elements are side walls.

15. A microscope comprising the holder for a microscope slide according to claim 1.

16. The holder according to claim 1, wherein the receiving area further comprises an open recess between the first contact surface and the second contact surface such that there is an opening below the microscope slide after insertion.

17. A method for controlling a microscope, the method comprising:
 providing a holder for a microscope slide that has a width and a length, the length being less than the width, the holder comprising:
  a receiving area that has a first contact surface and a second contact surface opposite the first contact surface, a first counter-surface that partially spans the first contact surface so as to form a first slot extending in a direction of insertion along the length of the microscope slide, and a second counter-surface that partially spans the second contact surface so as to form a second slot extending in the direction of insertion along the length of the microscope slide, wherein the first contact surface and the second contact surface extend in the direction of insertion along the length of the microscope slide at least twice as far as an extent of the first counter-surface and the second counter-surface, such that the microscope slide travels along the first contact surface and the second contact surface before receipt in the first slot and the second slot, wherein the receiving area is bounded on three sides by side elements and has an opening on one side for insertion of the microscope slide, and
  at least one pressure element arranged within the receiving area and configured to exert a restoring force directed towards an interior of the receiving area; and
 inserting the microscope slide along the insertion direction into a slotted receiving space of the holder for the microscope slide, wherein the microscope slide is moved along the insertion direction until a sensor arranged in a rear region of the receiving space detects a contact with the microscope slide.

18. The method according to claim 17, further comprising:
 detecting a change in pressure by an approach of a lens to the microscope slide until a pressure sensor mounted in the holder;
 setting of a value of actual clearance between the lens and microscope slide to zero; and
 adjusting of the actual clearance such that the actual clearance corresponds to a known free working clearance of the lens.

19. A holder for a microscope slide that has a width and a length, the length being less than the width, the holder comprising:
- a receiving area that has a first contact surface and a second contact surface opposite the first contact surface, a first counter-surface that partially spans the first contact surface so as to form a first slot extending in a direction of insertion along the length of the microscope slide, and a second counter-surface that partially spans the second contact surface so as to form a second slot extending in the direction of insertion along the length of the microscope slide, wherein the first contact surface and the second contact surface extend in the direction of insertion along the length of the microscope slide at least twice as far as an extent of the first counter-surface and the second counter-surface, such that the microscope slide travels along the first contact surface and the second contact surface before receipt in the first slot and the second slot, wherein the receiving area is bounded on three sides by side elements and has an opening on one side for insertion of the microscope slide; and
- at least one pressure element arranged within the receiving area and configured to exert a restoring force directed towards an interior of the receiving area,
- wherein the three side elements include first and second side elements that are parallel to each other and extend in the direction of insertion, and a third side element that is perpendicular to the first and second side elements, wherein the first counter-surface is fixed to the first and third side elements, and the second counter-surface is fixed to the second and third side elements.

* * * * *